United States Patent
Iwanabe

(10) Patent No.: US 9,280,994 B1
(45) Date of Patent: Mar. 8, 2016

(54) THERMALLY ASSISTED MAGNETIC RECORDING HEAD WITH OPTICAL SPOT-SIZE CONVERTER ATTACHED TWO DIMENSIONAL THIN WAVEGUIDE

(71) Applicant: HGST Netherlands B.V., Amsterdam (NL)

(72) Inventor: Yasuhiko Iwanabe, Arakawa-Ku (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/493,299

(22) Filed: Sep. 22, 2014

(51) Int. Cl.
*G11B 5/00* (2006.01)
*G11B 5/48* (2006.01)
*G11B 5/60* (2006.01)

(52) U.S. Cl.
CPC ............ *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,330,404 B2 | 2/2008 | Peng et al. | |
| 8,170,389 B1 | 5/2012 | Komura et al. | |
| 8,295,003 B2 | 10/2012 | Chou et al. | |
| 8,325,568 B2 | 12/2012 | Komura et al. | |
| 8,385,160 B2 | 2/2013 | Hara et al. | |
| 8,400,886 B2 | 3/2013 | Hara et al. | |
| 8,406,092 B2 | 3/2013 | Tomikawa et al. | |
| 8,416,646 B2 | 4/2013 | Huang et al. | |
| 2012/0182842 A1* | 7/2012 | Iwanabe et al. | 369/13.17 |
| 2012/0224820 A1 | 9/2012 | Onishi | |
| 2012/0327751 A1* | 12/2012 | Iwanabe et al. | 369/13.02 |

FOREIGN PATENT DOCUMENTS

JP 2001-255254 9/2001

OTHER PUBLICATIONS

Mitomi, O. et al.; "Optical Spot-Size Converters for Lowloss Coupling between Fibers and Optoelectronic Semiconductor Devices"; IEEE Journal of Lightwave Technology; vol. 14, Issue 7; Jul. 1996.
Matsumoto, T. et al.; "Writing 40 NM Marks by Using a Beaked Metallic Plate Near-Field Optical Probe"; Optic Letters, vol. 31, Issue 2; Jan. 15, 2006.
Shi, X. et al.; Ultrahigh light transmission through a C-Shaped Nanoaperture; Optic Letters, vol. 28, Issue 15; Aug. 1, 2003.

* cited by examiner

*Primary Examiner* — Brian Butcher
(74) *Attorney, Agent, or Firm* — Patterson & Sheridan, LLP

(57) ABSTRACT

One embodiment generally relates to a magnetic recording head. The magnetic recording head has a body having an upper surface and a media bearing surface, a spot size converter disposed in the body and extending from the upper surface to the media bearing surface. The spot size converter has a core, comprising a first portion having a rectangular wall extending below the upper surface; and a second portion having a trapezoidal wall extending below the first portion. The magnetic recording head additionally has a first cladding adjacent to the spot size converter in an in-surface direction of the spot size converter, wherein the first cladding has a first refractive index lower than a refractive index of the spot size converter.

19 Claims, 13 Drawing Sheets

THERMALLY ASSISTED MAGNETIC RECORDING HEAD WITH OPTICAL SPOT-SIZE CONVERTER ATTACHED TWO DIMENSIONAL THIN WAVEGUIDE

BACKGROUND

1. Field

Embodiments disclosed herein generally relate to a thermally assisted magnetic recording head and a magnetic recording device provided therewith for use in a hard disk drive.

2. Description of the Related Art

Areal recording densities for magnetic recording devices continue to increase requiring the size of the magnetic bits in the recording media of these devices to become increasingly smaller and more compact. In conventional magnetic recording devices, a greater recording density was achieved by reducing the size and spacing of the magnetic grains (bits) for the magnetic recording media along with shrinking the magnetic recording head for writing the bits. Due to heat fluctuations in the magnetic recording devices, the magnetic information recorded in the media may be lost over a short period of time. This loss of recorded magnetic information may occur at room temperatures in recording media which has an areal recording density in excess of 1 Tbit/inch$^2$. In order to prevent the loss of the recorded magnetic information, a coercive force (coercivity) may be raised for the magnetic recording media. The coercivity is the intensity of the applied magnetic field. However, there are limits to the magnitude of the magnetic field that can be generated from the magnetic recording head. Forming recording bits on the magnetic media becomes difficult if the coercive force increases too much.

In recent years, the industry has turned to a method of thermally assisted magnetic recording. In this method, the coercivity is lowered by heating the media while recording onto the recording media. Thermally assisted magnetic recording achieves a high recording density by locally heating the recording media, i.e. restricting the heat solely to the recording region. The heating of the recording media is performed by a minute light spot generated at a high power density. In a conventional thermally assisted magnetic recording head, a lens is used to generate the minute light spot. The lens adds additional weight to the thermally assisted magnetic recording head.

Increasing areal recording densities for the recording media have resulted in a decrease of the distance (gap) between the magnetic recording head and the magnetic recording media. The magnetic recording head is elevated off the recording media surface by a cushion of air as the disk spins. As the gap between the magnetic write head and the magnetic recording media approaches 10 nm or less, the cushion of air is no longer capable of levitating, or supporting, the magnetic recording head off the magnetic recording media. The weight of the lens mounted on the magnetic recording head causes the magnetic recording head to come into contact with the magnetic recording media.

The magnetic recording device may support a plurality of magnetic recording media (discs) stacked within the magnetic recording device and the space between adjacent discs is typically less than 1 mm. Thus, a space the size of approximately 1 mm must support the gap along with the magnetic recording head and all the additional components supporting the magnetic recording head, i.e. support arm. As a result, optical elements, such as a lens, have become undesirable to mount to the magnetic recording head because the additional weight of the optical elements may cause the magnetic recording head to come into contact with the recording media and damage the magnetic recording device.

Therefore there is a need in the art for a thermally assisted magnetic recording head for use with increased areal recording densities.

SUMMARY

One embodiment generally relates to a magnetic recording head. The magnetic recording head has a body having an upper surface and a media facing surface, a spot size converter disposed in the body and extending from the upper surface to the media bearing surface. The spot size converter has a core, comprising a first portion having a rectangular wall extending below the upper surface; and a second portion having a trapezoidal wall extending below the first portion. The magnetic recording head additionally has a first cladding adjacent to the spot size converter in an in-surface direction of the spot size converter, wherein the first cladding has a first refractive index lower than a refractive index of the spot size converter.

Another embodiment generally relates to a magnetic recording head having a body having an upper surface and a media bearing surface; a spot size converter disposed in the body and extending from the upper surface to the media bearing surface. The spot size converter has a core with an opening along the upper surface and a tip at the media bearing surface. The core has a first portion having a rectangular wall extending below the upper surface; and a second portion having a trapezoidal wall extending below the first portion. The magnetic recording head additionally has a first cladding adjacent to the spot size converter and in a surface direction of the spot size converter; a second cladding adjacently arranged in the film thickness direction of the spot size converter; and an external cladding member arranged in the film thickness direction and sandwiches the second cladding member, wherein the external cladding members has a lower refractive index than a refractive index of the second cladding member, and the refractive index of the second cladding is less than a refractive index for the first cladding, and the refractive index of the first cladding is lower than a refractive index of the spot size converter.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In a magnetic recording device in which a thermally assisted magnetic recording method is adopted, the spot size of the light that is emitted from the light source and injected into the light guide extends from a few micrometers (μm) to a few tens of μm. When the light is directly injected into a core having a width and thickness on the order of around a submicron, the coupling loss of the light becomes considerable. Thus, the efficiency for utilization of the light is adversely affected. The consequence of this is that when attempting to implement thermally assisted magnetic recording, the emission power of the light source must be increased. This increase in emission power results in an increase in overall power consumption of the magnetic recording device and tends to elevate a temperature within the magnetic recording device. In particular, the temperature elevation can be correlated to the degradation of the magnetic recording device performance. It is therefore necessary to form a light guide in the magnetic recording head whereby the light having a large spot size can be converted to light of a small spot size without power loss.

A conventional light guide (hereinbelow, this will be termed a spot size converter) may convert the spot size of light. In the conventional spot size converter, light with a comparatively large spot size is propagated through the conventional spot size converter and the spot size is reduced to an order of about a submicron. The core of the spot size converter is of a material having a high refractive index sized a few tens of nanometers (nm) and becomes progressively wider in the direction the light propagates.

Figure 1:
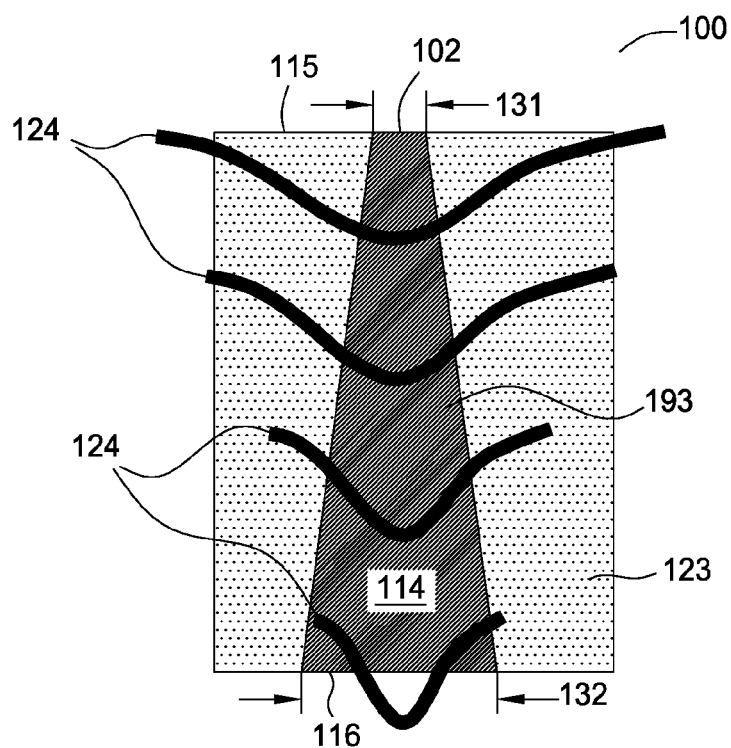
FIG. 1 is a cross-sectional diagram showing the change in a light intensity profile for light propagated through a conventional waveguide comprising a tapered core and a cladding member.

FIG. 1 is a cross-sectional diagram showing the change in a light intensity profile 124 for light propagated through a conventional spot size converter 193, for a wave guide 100. The conventional spot size converter 193 has an opening 102, a core 114 and a cladding member 123. The opening 102 of the core 114 is at an upper portion 115 of the wave guide 100. The core 114 flares from the upper portion 115, where the core 114 has a narrow width 131, to a lower portion 116 where the core 114 has a wide width 132. The spot size of the light decreases as the light propagates from the opening 102 and then along the core 114 of the conventional spot size converter 193.

Figure 2:
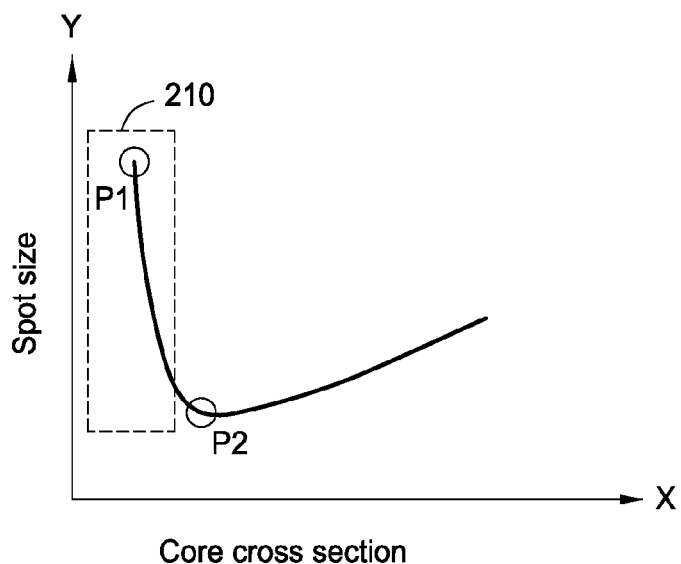
FIG. 2 is a diagram showing the relationship of the spot size for the light that propagated through and coupled with the waveguide of FIG. 1 and the core cross-sectional area.

FIG. 2 is a diagram showing the relationship of the spot size for the light propagated through the conventional spot size converter 193 of FIG. 1 and the core cross-sectional area. The horizontal axis (x) depicts the cross-sectional area for the core 114 of the conventional spot size converter 193 and the vertical axis (y) is the spot size of the light as it propagates through the core 114. The core cross section of the conventional spot size converter 193 may be optimized by means of using a region 210 of the graph to determine a point where a larger core cross-section causes the light spot to grow. The region 210, identified by the phantom rectangle in FIG. 2, is where considerable leakage takes place from the core. For example, starting with the core cross section starting at P1, i.e. the small core cross-section portion or opening 102, as the core cross section enlarges a corresponding decrease in seen in the spot size until the core cross section width approaches P2. After P2, the spot size starts to grow in combination with any additional increase of the core cross-sectional area. Therefore, the diameter of the core cross section may be used to determine the spot size and the light intensity.

However, in order to achieve an efficient coupling of the light with the spot size of about a few micrometers (μm) to about a few tens of μm, the size of the opening may need to be less than a few tens of nm. Therefore, the size at the opening 102 of the core must be as large as possible. Taking into account the variability and accuracy in processing, this limitation presents difficulties in manufacturing the conventional spot size converter 193 and bringing the conventional spot size converter 193 to market.

An object of one embodiment is for a magnetic recording device in which a miniature, lightweight optical element is mounted on a magnetic write head. The optical element reduces a spot size of a light to an order of about a submicron. The minute light size may efficiently be directed onto a magnetic recording medium by a spot size converter that can be manufactured very easily and formed in the magnetic recording head.

One method of producing a minute light spot on a magnetic recording medium without employing a lens, or the like, is the method of forming a light guide comprising a core and cladding within the magnetic write head. This can be achieved by forming a core having width and thickness of an order of about a submicron and having a material with a large difference in the refractive index (Δn) to that of a cladding material.

Figure 3:
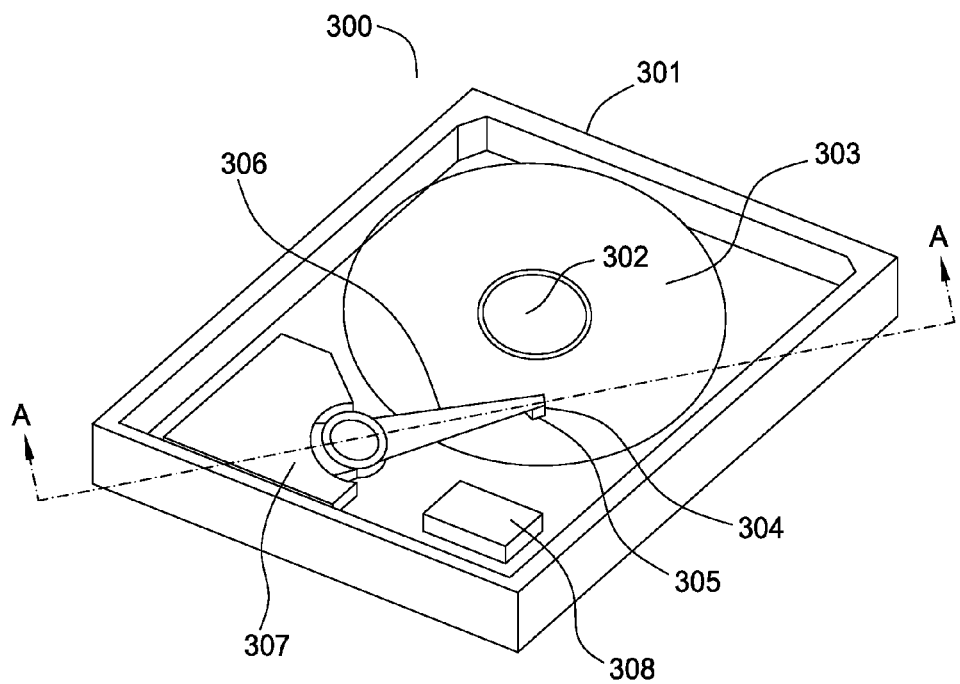
FIG. 3 is a perspective view showing a magnetic recording device according to one embodiment.
Figure 4:
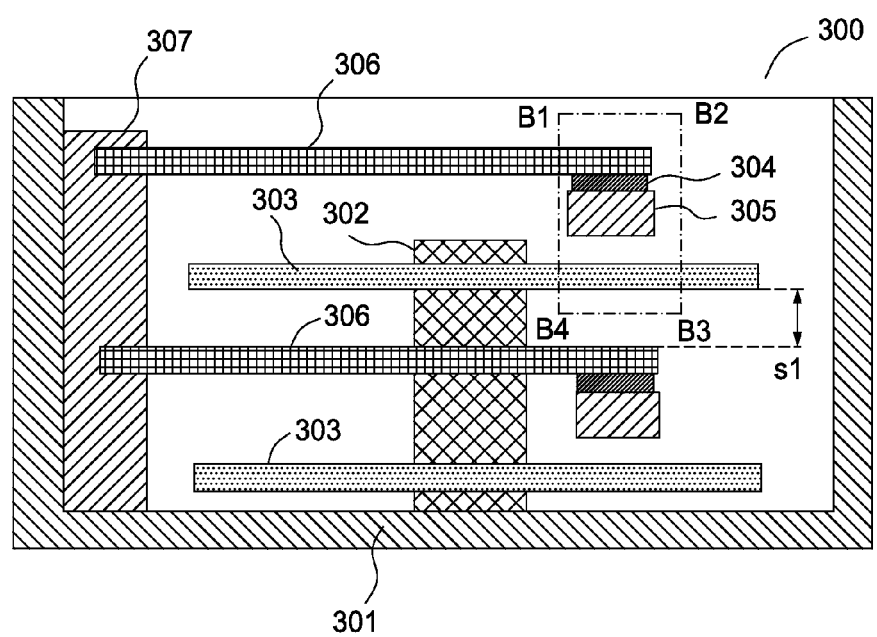
FIG. 4 is a cross-sectional view along the line A-A of FIG. 3.
Figure 5:
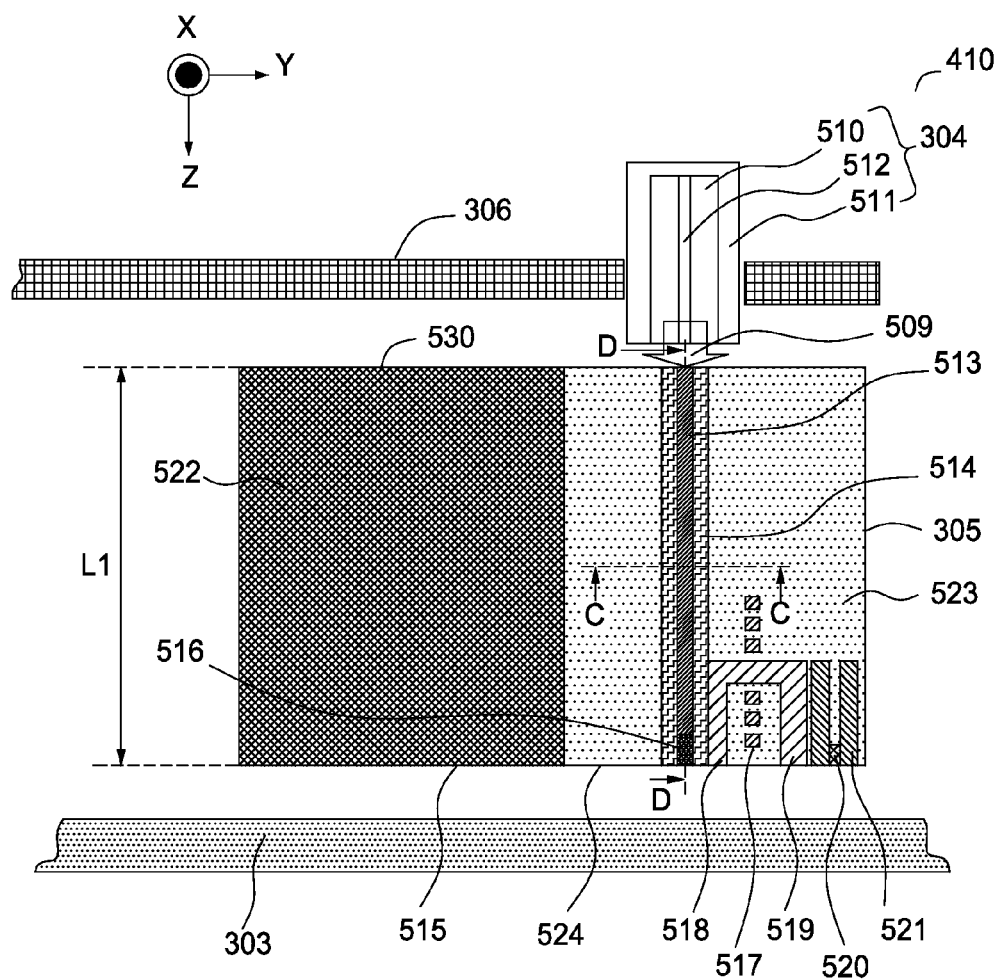
FIG. 5 is a portion of FIG. 4 bounded by a region B1-B2-B3-B4 showing a magnetic write head having a spot size converter, according to one embodiment.

An embodiment of a novel information recording device having a highly efficient integrated optical element is described below with reference to FIG. 3, FIG. 4 and FIG. 5. FIG. 3 is a perspective view showing a magnetic recording device 300 according to one embodiment. The magnetic recording device 300 has a frame 301 in which the top cover has been removed. FIG. 4 is a cross-sectional view along the section line A-A of FIG. 3. FIG. 5 is a portion of FIG. 4 bounded by a region B1-B2-B3-B4 410 showing a magnetic write head 305 having a spot size converter 513.

As shown in FIG. 3, a magnetic recording medium 303 is rotated by being fixed to a spindle 302 that is driven to rotate by a motor (not shown). The magnetic write head 305 is fixed to a suspension arm 306 and is positioned by a voice coil motor 307. The voice coil motor 307 locates the magnetic write head 305 on a desired track of the magnetic recording medium 303. The magnetic write head 305 has a base 522. As shown in FIG. 5, a media facing surface (MFS) 515, such as an air bearing surface (ABS), is formed at the bottom face 524 of the magnetic write head 305. During the rotation of the magnetic recording medium 303, negative air pressure is produced between the magnetic recording medium 303 and the MFS 515 of the magnetic write head 305. As a result, the magnetic write head 305 is suspended on a cushion of air and levitates about 10 nm over the magnetic recording medium 303.

As shown in FIG. 4, within the frame 301 there is at least one magnetic recording medium 303 fixed to the spindle 302 and at least one suspension arm 306 fixed to the voice coil motor 307. The distance s1 between the suspension arm 306 and the upper-level magnetic recording medium 303 is no more than about one millimeter. In FIG. 5, the magnetic write head 305 is configured with a light source 304 for performing thermally assisted magnetic recording. The light source 304 is arranged between the suspension arm 306 and the magnetic write head 305 and emits a light 509. The light 509 is radiated through the magnetic write head 305 towards the magnetic recording medium 303. The light source 304 is configured to generate light 509 for heating the magnetic recording medium 303.

A spot size converter 513 is formed within the body of the magnetic write head 305. The spot size converter 513 may reduce a spot size of the light 509 while increasing the intensity of the light 509. The light 509 enters the magnetic write head 305 at an upper surface 530, propagates through the spot size converter 513, and exits at the MFS 515. The light 509 heats the magnetic recording medium 303. The magnetic write head 305 may have a length L1 of about 180 μm to about 230 μm. The spot size converter 513 may have one or more of a lower refractive index cladding member 514 and/or a cladding 523 disposed adjacently. The base of the magnetic head 522 may be formed from the material AlTiC.

The light source 304 may comprise a semiconductor laser 510. The semiconductor laser 510 may be mounted on a sub-mount 511 and in a single mode generate light 509 of a wavelength about 760±20 nm or a wavelength about 830±20 nm. The semiconductor laser 510 may have an active layer 512 substantially perpendicular to the upper surface 530 of the magnetic write head 305 which aids in the light 509 injecting into the spot size converter 513.

The region between the semiconductor laser 510 and the upper surface 530 of the magnetic write head 305 may suitably be filled with a material that has little optical absorption and whose refractive index is higher than that of the air (refractive index >1). In this way, broadening of the spot size for the light 509 emitted from the semiconductor laser 510 can be minimized. The region between the semiconductor laser 510 and the upper surface 530 for the magnetic write head 305 may be filled with a material, such as a UV cured resin or thermosetting adhesive, suitable for sticking together optical components. The material may additionally act as an adhesive for sticking together the sub-mount 511 to the magnetic write head 305 and suppress broadening of the spot size of the light 509.

The light 509 may be emitted (injected) from the light source 304, propagated through the interior of the spot size converter 513, and emanate from the MFS 515 of the magnetic write head 305. The spot size converter 513 reduces the spot size of the light 509, from the upper surface 530 until it is directed through the MFS 515 out onto the magnetic recording medium 303. A near-field light generating element 516, capable of generating a minute light spot, may be formed in the spot size converter 513 at the MFS 515. The near-field light generating element 516 may be a metallic dispersion body having a triangular shape. An optical screening film may be formed around a near-field light generating element 516 in order to ensure that no background light is directed onto the magnetic recording medium 303 from the vicinity of the near-field light generating element 516. The near-field light generating element 516 may have a V-shaped aperture or a C-shaped aperture formed by linking part of the metallic dispersion body with the optical screening film.

A magnetic field is generated using a thin-film coil 517 formed within the magnetic write head for recording on the magnetic recording medium 303. A main magnetic pole 518 and the thin-film coil 517 generate the magnetic field near the near-field light generating element 516 of the spot size converter 313 on the MFS 515. The distance between the main magnetic pole 518 and the spot size converter 513 is about 200 nm or less. An auxiliary magnetic pole 519, for forming a closed magnetic circuit, is formed on the opposite side of the thin-film coil 517 from the main magnetic pole 518. The auxiliary magnetic pole 519, the thin-film coil 517 and the main magnetic pole 518 may form a GMR (giant magneto-resistive) element or a TMR (tunneling magneto-resistive) element. A magnetic field generating element 520 is disposed adjacent to the auxiliary magnetic pole 519 along the MFS 515. The magnetic field generating element 520 may generate the recording marks in the magnetic recording medium 303. At the periphery of the magnetic field generating element 520, a shield 521 is formed for shielding the magnetic fields emanating from the magnetic field generating element 520.

A method for recording and playing back the aforementioned magnetic recording device is described as follows: the magnetic recording medium 303 is made to rotate by the rotating the spindle 302 with the motor; the semiconductor laser 510 emits the light 509 which enters the spot size converted 513; the light 509 propagates through the spot size converter 513 and exits at the MFS 515 and forms a magnetic recording mark on the magnetic recording medium 303; a magnetic field is generated by the thin-film coil 517 provided in the magnetic write head 305; finally, the light 509 propagated through the spot size converter 513 and generated by the semiconductor laser 510, heats the magnetic recording medium 303, thereby implementing thermally assisted magnetic recording.

The thermally assisted magnetic recording is performed by raising the temperature of the magnetic recording medium 303. Thus, the timing for generating the magnetic field and for the light source 304 emitting the light 509 do not necessarily have to be concurrent. For example, the magnetic field may be generated after heating up the magnetic recording medium 303 by emitting the light 509 from the light source 304. Additionally, the light 509 may be emitted continuously by the light source 304 onto the magnetic recording medium 303. The magnetic information may be recorded onto the magnetic recording medium 303 by applying and modulating a magnetic field pulse. Furthermore, magnetic information may be recorded onto the magnetic recording medium 303 by applying the magnetic field while emitting the light 509 and modulating the information to be recorded to an optical pulse or signal. A signal processing chip 308, as shown in FIG. 3 may process the signal. The magnetic field generating element 520 formed in the magnetic write head 305 may generate the magnetic recording marks in the magnetic recording medium 303 from the signal.

The spot size converter 513, formed within the magnetic write head 305, will be described in detail with reference to FIG. 5 along with FIGS. 6A through 14. The cross-sectional diagram of FIG. 5 shows the vicinity of the spot size converter 513 in the magnetic write head 305. The spot size converter 513 is covered with a cladding member 523. The spot size converter 513 directs the light 509 that is emitted from the light source 304 to the MFS 515 of the magnetic write head 305. The light 509 is emitted from the MFS 515 and forms a minute sized spot onto the magnetic recording medium 303.

Figure 6A:
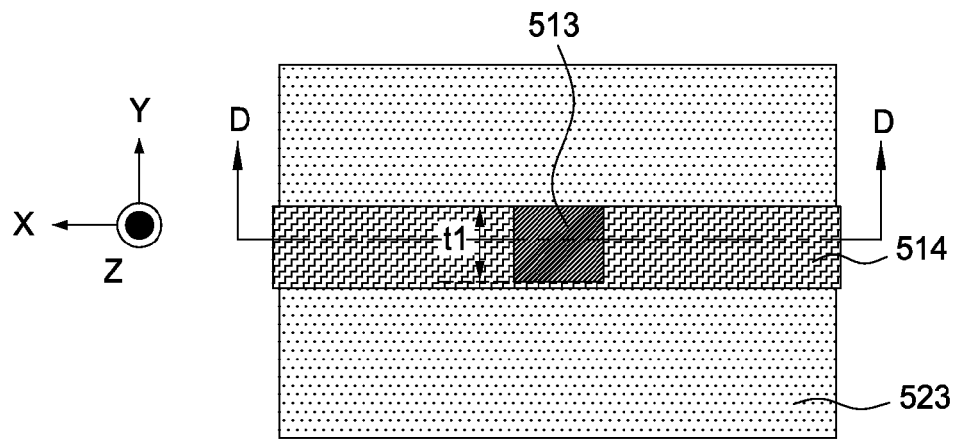
FIG. 6A is a cross-sectional view along the line C-C of FIG. 5.
Figure 6B:
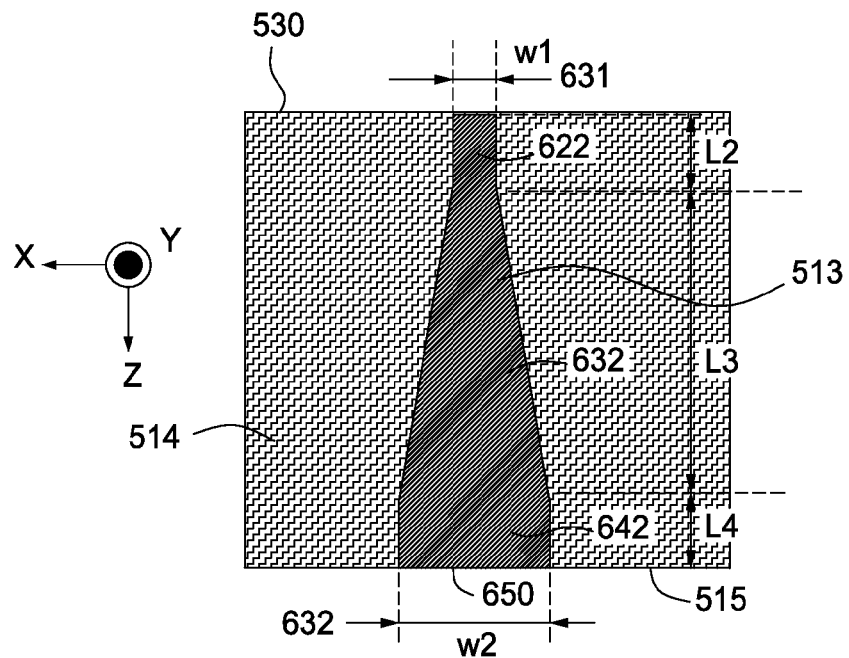
FIG. 6B is a cross-sectional view along the line D-D of FIG. 5.

FIG. 6A is a cross-sectional view along section line C-C of FIG. 5. FIG. 6B is a cross-sectional view along section line D-D in FIG. 5. The spot size converter 513 of FIGS. 6A and 6B have at least one cladding that is adjacently arranged in the in-surface direction with a refractive index that is lower than the refractive index of a cladding that is adjacently arranged in the film thickness direction of the spot size converter 513. In the Figures, the X direction is defined as the in-surface direction and the Y direction is defined as the film thickness direction. The orientation for the coordinate system is shown along with the Figures.

The spot size converter 513 is characterized in that the refractive index of at least one of the adjacent cladding members 514 in the in-surface direction of the spot size converter 513 is lower than the refractive index of a cladding 523 that is adjacent thereto in the film thickness direction of the spot size converter 513. It should be noted that both the lower refractive index cladding member 514 and the cladding member 523 are constructed of material having a lower refractive index than that of the spot size converter 513. In addition, the cladding member 523 and the lower refractive index cladding member 514 are of effectively infinite extent in the in-surface direction, i.e. in the x-direction of FIGS. 6A and 6B.

The spot size converter 513 allows the light to propagate therethrough. The spot size converter 513 may be comprised of a first section 622 and a second section 632. Additionally spot size converter 513 may have a third section 642. The first section 622 has a length L2 and is rectangular from the upper surface 530 of magnetic write head 305 to the second section 632. The second section 632 has a length L3 and has a trapezoid shape which flares outward from the first section 622 to the third section 642. The third section 642 has a length L4 which extends from the second section 632 to the MFS 515 and is rectangular in shape. The length L2+L3 of the first section 622 and the second section 632 of the spot size converter 313 may be substantially similar to the length (L1) of the magnetic write head i.e. about 180 µm to about 230 µm.

The shape of the spot size converter 513, when viewed from the XZ plane is a combination of a substantially rectangular shape for the first section 622 and a substantially trapezoidal shape for the second section 632. The shape of the spot size converter 513 may also include a substantially rectangular shape for the third section 642. Thus, spot size converter 513 increases in width from the upper surface 530 to the MFS 515 of the magnetic write head 305.

The spot size converter 513 additionally has a tip 650. The tip 650 is disposed on the MFS 515 of the recording head. The tip 650 may be wider than the opening due in part to the flaring of the trapezoidal shaped for the second section 632 of the spot size converter 513.

The spot size converter 513 uses the lower refractive index cladding member 514 for increasing the efficiency of optical coupling for the injected light 509. Additionally, the trapezoid shape of spot size converter 513 assists the spot size converter 513 in reducing the spot size of the light 509.

In one embodiment, the cladding member 523 may be made of an alumina ($Al_2O_3$) material having a refractive index of about 1.65 to about 1.68. Alumina may also be used for cladding member 514, but the refractive index for cladding member 514 will be lower than the refractive index for cladding member 523. The lower refractive index cladding member 514 may have a refractive index of about 1.54 to about 1.61. The spot size converter 513 may be made of tantalum pentoxide ($Ta_2O_5$) which has a refractive index of about 2.10 to about 2.13. As long as the refractive index difference (Δn) between the cladding member 523 and the lower refractive index cladding member 514 is the same as the refractive index difference between the lower refractive index cladding member 514 and the spot size converter 513, the performance of the waveguide (the spot size converter is a type of waveguide) will be substantially unaffected. For example, the spot size converter 513 may be formed from a $Si_3N_4$ material having a refractive index of about 1.89 to about 2.10; the lower refractive index cladding member 514 may be formed from a $SiO_2$—$Si_3N_4$ material having a refractive index between about 1.45 and about 2.10; and the cladding member 523 may be formed from a $SiO_2$—$Si_3N_4$ material having a refractive index between about 1.45 and about 2.10. It is to be noted that the refractive index of the cladding member 523 and the refractive index of the cladding member 514 are different. The $SiO_2$—$Si_3N_4$ material may be formed by simultaneously sputtering a $SiO_2$ and $Si_3N_4$ material while controlling the film deposition rate of $SiO_2$ and the film deposition rate of $Si_3N_4$. In one embodiment, the cladding member 523 may comprise $Al_2O_3$—$Si_3N_4$. Also, the width w2 of the tip 650 of the spot size converter 513 may be about 0.5 μm to about 0.6 μm and the terminal thickness t1 may be about 0.2 μm or about 0.3 μm or about 0.4 μm.

As described above, the spot size converter 513 directs light of a minute spot size onto the magnetic recording medium 303. The light having a spot size of about 500 nm may be directed towards the magnetic recording medium 303 from the tip 650 of the spot size converter 513 by adjusting the terminal width w2 and the terminal thickness t1 of the tip 650. The tip 650 may comprise the near-field light generating element 516 formed at the MFS 515 of the spot size converter 513. The near-field light generating element 516 may be formed in the tip 650 by matching the width w2 and the thickness t1 of the tip 650 so that the width w2 and thickness t1 are both less than 0.5 μm.

As shown in FIG. 5, the main magnetic pole 518 and/or auxiliary magnetic pole 519 and/or thin-film coil 517 are present in the vicinity of the near-field light generating element 516 of the magnetic write head. Light in this vicinity may propagate by leaking through the third section 642 of the spot size converter 513 and may be absorbed by the main magnetic pole 518 and/or auxiliary magnetic pole 519 and/or thin-film coil 517. This leakage of the light 509 reduces the efficiency of its optical transmission. The spot size converter 513 constrains the light leakage in the vicinity of the main magnetic pole 518 and/or auxiliary magnetic pole 519 and/or thin-film coil 517 by using the third section 642 of the spot size converter 513. Thus, the spot size converter 513 improves the optical transmission efficiency otherwise diminished by the leakage of the light 509.

In one embodiment, the length L4 of the third section 642 may be about 16 μm to about 30 μm. The width w1 of the opening 602 at the upper surface of the spot size converter 513 and/or the thickness t1 are kept below the width or thickness at which the leakage mode described above occurs that is about less than 0.5 μm.

The width or thickness (Ww) may be obtained by transforming the standing wave condition expression for a 0-order mode within the light guide. The width or thickness (Ww) suitable for obtaining a leakage mode, may be determined by the following expression:

$$\overline{W}w = \frac{\pi}{2\pi \cdot n_1 \cdot \sin\theta_1 / \lambda} \quad (1)$$

Wherein: $\theta_1$ is the critical angle for light at the interface of the core and the cladding, and may be expressed by the following expression:

$$\theta_1 = \sin^{-1}\left(\frac{\sqrt{n_1^2 - n_2^2}}{n_1}\right) \quad (2)$$

λ is the wavelength of light in vacuum;
$n_1$ is the refractive index of the spot size converter; and
$n_2$ is the refractive index of the two-dimensional waveguide or cladding member.

Figure 7:
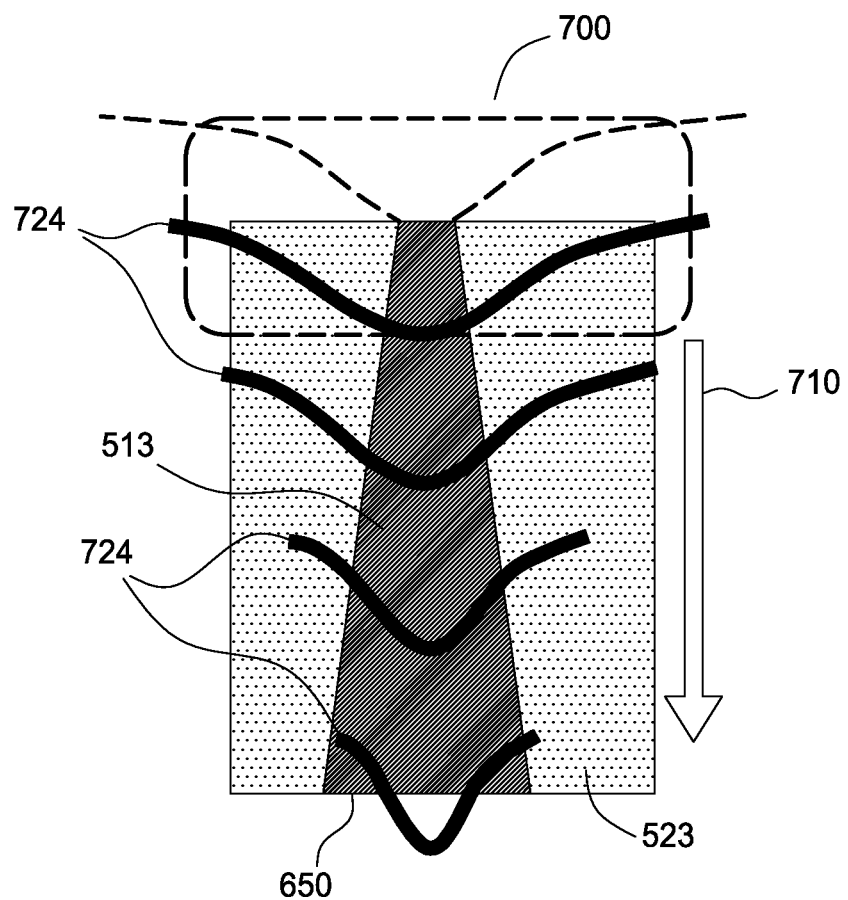
FIG. 7 demonstrates the light application efficiency of the spot size converter.

The efficiency for the optical utilization of the spot size converter 513 will be described with reference to FIG. 7. The efficiency of optical utilization ($\eta_{ou}$) of a spot size converter 513 is determined by multiplying the light coupling efficiency ($\eta_{lc}$) 700 of the entrance 602 of the spot size converter 513 and the injected light 509 by the optical spot size conversion efficiency ($\eta_c$) 710 of the spot size converter. That is, $\eta_{ou}=\eta_{lc}\cdot\eta_c$. The size of light intensity profile 724 for the light 509 is shrunk as the light 509 propagates through the spot size converter 514.

The lower refractive index cladding member 514, for the spot size converter 513, provides highly efficient optical coupling of the injected light 509 and allows the width 631 of the first section 622 disposed on the upper surface 530 of the spot size converter 513 to be increased. The effects of increasing the width 631 of the first section 622 will be discussed relative to the light coupling efficiency $\eta_{lc}$.

Figure 8:
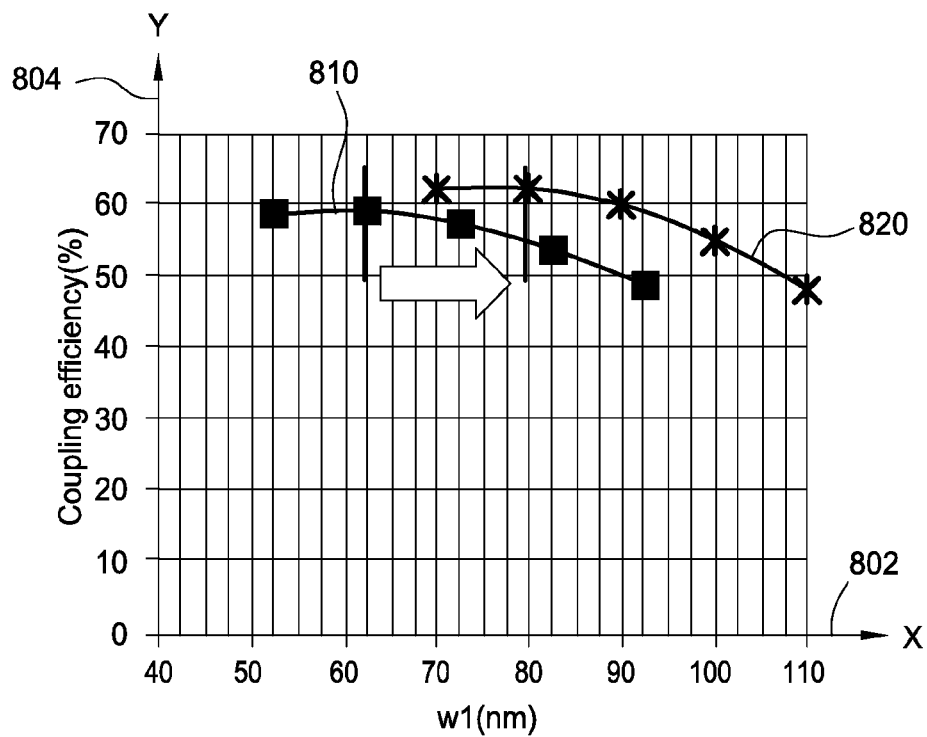
FIG. 8 is a graph illustrating the relationship of the injected light with a tip width of the spot size converter and a light coupling efficiency.

FIG. 8 shows the calculated results, using the beam propagation method (BPM), for a relationship of the width w1 of the first section 622 of the spot size converter 513 and the light coupling efficiency $\eta_{lc}$ of the injected light 509 at the opening 602 disposed on the upper surface 530 of the spot size converter 513. The horizontal axis 802 shows the width w1, in units of nanometers, for the first section 622 of the spot size converter 513. The vertical axis 804 shows the light coupling efficiency $\eta_{lc}$ of the injected light 509 at the upper surface 530 of the spot size converter 513. The light coupling efficiency $\eta_{lc}$ is derived by overlapping the integration of the light intensity profile of the injected light 509 and the light intensity profile of the light that can be propagated by the first section 622 of the spot size converter 513 (i.e. the mode profile).

The light injected to the spot size converter 513 may have a wavelength of about 830±20 nm, is substantially polarized in the Y direction, and generates a spot size of about 5 μm. The first section 622 may have a thickness t1 of about 0.36 μm, and the length L2 of the first section 622 may be about 6 μm. A line labeled 820 shows the light coupling efficiency $\eta_{lc}$ calculated for the spot size converter 513 having a lower refractive index cladding member 514. As a comparison, a line labeled 810 shows the light coupling efficiency $\eta_{lc}$ calculated for the spot size converter 513 where the cladding member 523 was provided in the in-surface direction of the spot size converter 513 and no lower refractive index cladding member 514 was used. The situation of not using a lower refractive index cladding member 514 produced poor results. Namely, the light coupling efficiency when cladding member 514 is not present was significantly worse than when the cladding member 514 is present. Specifically, the maximum light coupling efficiency $\eta_{lc}$ was found for the spot size converter 513 having the lower refractive index cladding member 514. The spot size converter 513 having the lower refractive index cladding member 514 had a width w1 for the first section 622, at which the light coupling efficiency $\eta_{lc}$ was at a maximum of about 18 nm wider than the spot size converter 513 not having the lower refractive index cladding member 514.

Figure 9:
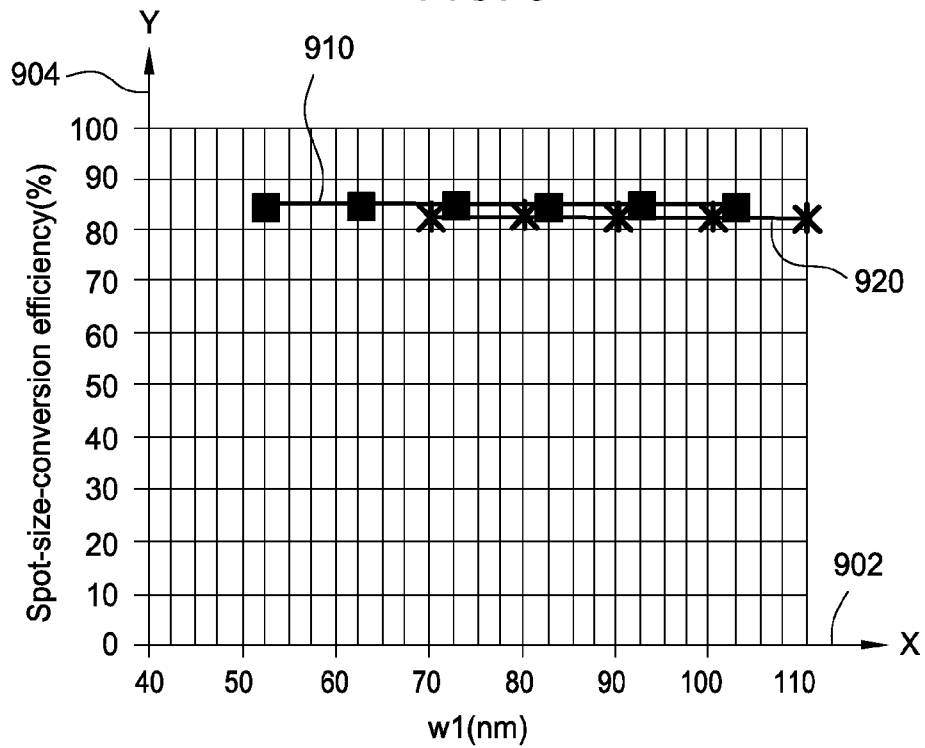
FIG. 9 is a graph illustrating the relationship of the injected light with the tip width of the spot size converter and the conversion efficiency of the spot size converter.

In FIG. 9, the spot size conversion efficiencies were calculated for the spot size converter 513 having a lower refractive index cladding member 514 and for the spot size converter 513 without the lower refractive index cladding member 514. The horizontal axis 902 shows the width w1 in nanometers for the first section 622 of the spot size converter 513. The vertical axis 904 shows the spot size conversion efficiency of the spot size converter 513. The spot size conversion efficiency is derived by injecting a light intensity profile (mode profile) which is capable of propagating through the first section 622 into the spot size converter 513 and calculating the amount of light, in the light intensity profile, which emanates from the tip 650 of the spot size converter 513. The spot size converter 513 is similarly configured to that described supra in relation to FIG. 8.

A line labeled 920 shows the spot size conversion efficiency calculated for the spot size converter 513 having a lower refractive index cladding member 514. A line labeled 910 shows the spot size conversion efficiency calculated for the spot size converter 513 without the cladding member 514. The spot size conversion efficiencies for the spot size converter 513 having the lower refractive index cladding member 514 (Shown by line 920) and the spot size converter 513 without the cladding member 514 (Shown by line 910) are substantially independent of the width w1 of the first section 622 for the spot size converter 513. Additionally, the spot size conversion efficiency for the spot size converter 513 having the lower refractive index cladding member 514 (Shown by line 920) and the spot size converter 513 without the lower refractive cladding member 514 (Shown by line 910) are substantially similar. From the results for the light coupling efficiency $\eta_{lc}$ displayed in FIG. 8 and the spot size conversion efficiencies displayed in FIG. 9, it can be seen that the width w1 of the first section 622 for the spot size converter 513 can be widened while still achieving an equivalent light application efficiency as would occur if the lower refractive index cladding member 514 were not present. This means that better processing precision and further suppression of variability may be obtained during manufacturing, by using the spot size converter 513 having the wider width w1 at the opening 602.

Figure 10A:
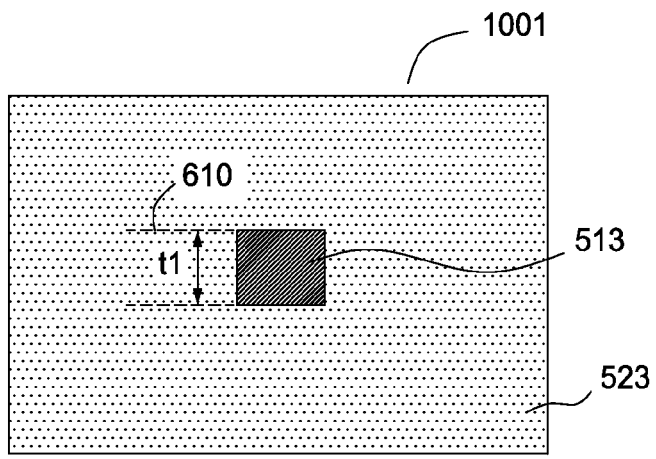
FIG. 10A is a top plan view for a portion of the magnetic write head showing the spot size converter surrounded at a periphery by a cladding member.
Figure 10B:
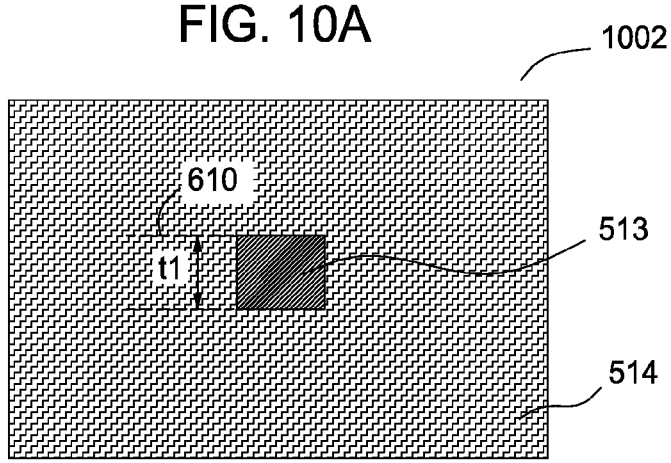
FIG. 10B is a top plan view for a portion of the magnetic write head showing the spot size converter surrounded at a periphery by a lower refractive index cladding member.
Figure 10C:
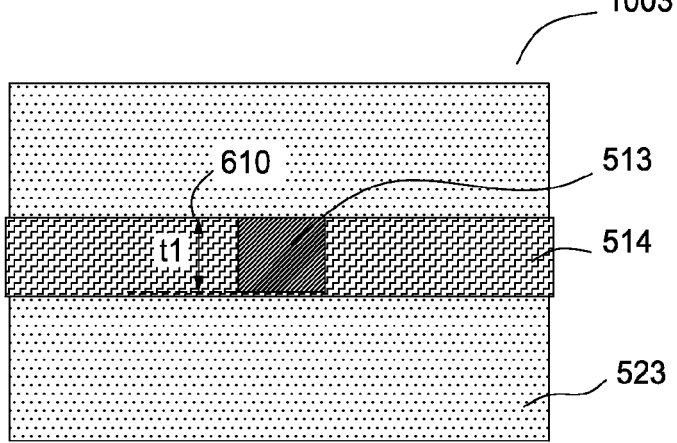
FIG. 10C is a top plan view for a portion of the magnetic write head showing the spot size converter with the lower refractive index cladding member oriented in the in-surface direction with the remainder of the adjacent cladding comprised of the cladding member.
Figure 10D:
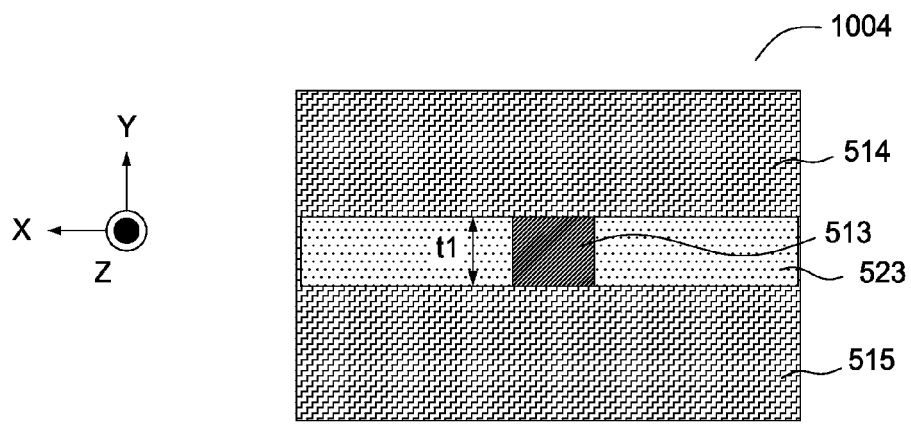
FIG. 10D is a top plan view for a portion of the magnetic write head showing the spot size converter with the cladding member oriented in the in-surface direction with the remainder of the adjacent cladding comprised of the lower refractive index cladding member.

A preferred mode for the application of a lower refractive index cladding member 514 will now be described. FIGS. 10A-10F depict examples showing variations for the arrangements of the cladding member 523 and the lower refractive index cladding member 514 surrounding the spot size converter 513. FIG. 10A is a top plan view for a wave guide 1001 of the magnetic write head 305 showing the spot size converter 513 surrounded at a periphery by a cladding member 523. FIG. 10B is a top plan view for a wave guide 1002 of the magnetic write head 305 showing the spot size converter 513 surrounded at a periphery by a lower refractive index cladding member 514. FIG. 10C is a top plan view for a wave guide 1003 of the magnetic write head 305 showing the spot size converter 513 with the lower refractive index cladding member 514 oriented in the in-surface direction with the remainder of the adjacent cladding comprised of the cladding member 523. FIG. 10D is a top plan view for a wave guide 1004 of the magnetic write head 305 showing the spot size converter 513 with the cladding member 523 oriented in the in-surface direction with the remainder of the adjacent cladding comprised of the lower refractive index cladding member 514.

Figure 10E:
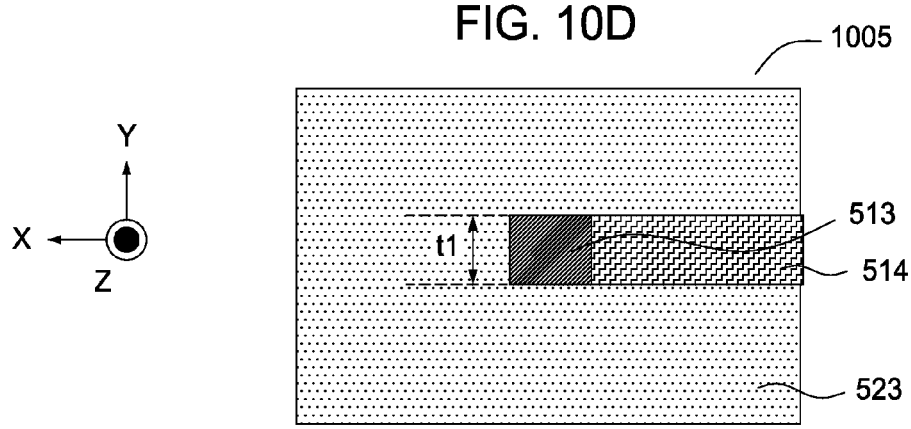
FIG. 10E is a top plan view for a portion of the magnetic write head showing the spot size converter with the lower refractive index cladding member oriented only on one side of the in-surface direction with the remainder of the adjacent cladding comprised of the cladding member.
Figure 10F:
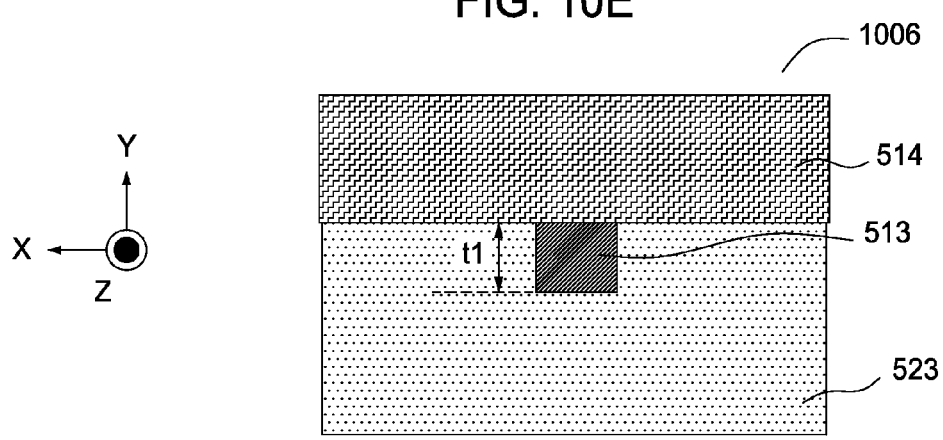
FIG. 10F is a top plan view for a portion of the magnetic write head showing the spot size converter with the lower refractive index cladding member in the film thickness direction and only on one side of the spot size converter with the remainder of the adjacent cladding comprised of the cladding member.

FIG. 10E is a top plan view for a wave guide 1005 of the magnetic write head 305 showing the spot size converter 513 with the lower refractive index cladding member 514 oriented only on one side of the in-surface direction with the remainder of the adjacent cladding comprised of the cladding member 523. FIG. 10F is a top plan view for a wave guide 1006 of the magnetic write head 305 showing the spot size converter 513 with the lower refractive index cladding member 514 in the film thickness direction and only on one side of the spot size converter with the remainder of the adjacent cladding comprised of the cladding member 523.

The shape of the spot size converter 513 illustrated in FIGS. 10A-10F are taken from the XZ plane and similar to the spot size converter 513 described above in relation to FIG. 6B. The spot size converter 513 has a shape which is substantially rectangular and flares out, i.e. increases in width such as a trapezoid, towards the media facing surface 515 of the magnetic write head 305. The spot size converter 513 is therefore wider at the tip 650 than w1 of the first section 622.

Figure 11:
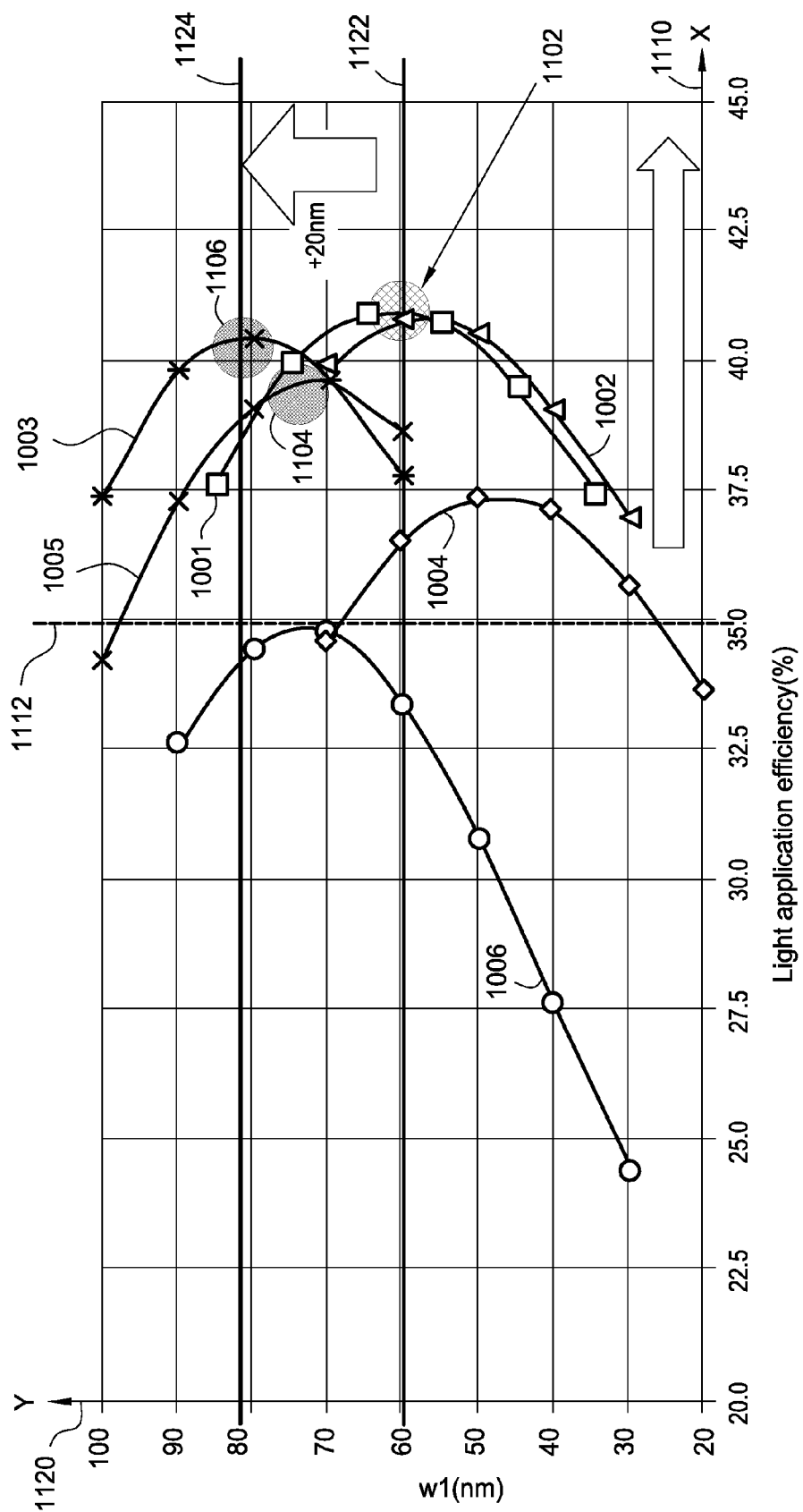
FIG. 11 is a graph illustrating the change of light application efficiency produced by the tip width of the spot size converters shown in FIGS. 10A-10F.

FIG. 11 illustrates a graph for the results calculated using the beam propagation method (BPM). The results show the light application efficiency for the various arrangements of the cladding member 523 and the lower refractive index cladding member 514 at the periphery of the spot size converter shown in FIGS. 10A through 10F. In FIG. 11, the horizontal axis 1110 shows the light application efficiency and the vertical axis 1120 shows the width w1 in nanometers for the first section 622 of the spot size converter 513. From the illustration in FIG. 11, it can be seen that the arrangement for the wave guide 1003 as shown in FIG. 10C and the arrangement for the wave guide 1005 as shown in FIG. 10E provide a maximum efficiency with a width w1 of first section 622 greater than the other arrangements for the wave guides 1001, 1002, 1004, 1006 shown respectively in FIG. 10A, 10B, 10D or 10F. The wave guide 1001, 1002, of FIGS. 10A and 10B have substantially equivalent light application efficiencies yet the width w1 for the opening 602 is smaller (shown at location labeled 1102) than either the width w1 for the first section 622 of wave guide 1003 (shown at location labeled 1106) or the width w1 for the first section 622 of wave guide 1005 (shown at location labeled 1104). For wave guide labeled 1003, the max width w1 for the first section 622 may be greater than 80 nm and is shown by a line labeled 1124. For the wave guides labeled 1001 and 1002, the max width w1 for the first section 622 is shown by a line labeled 1122 and is less than 60 nm. A difference for the width w1 for the first section 622 may be 20% or more. The wave guide 1006 shown in FIG. 10F has a large width w1 for the opening 602, however the light application efficiency is the lowest of the arrangements for the wave guides 1001, 1002, 1003, 1004, 1005. The width w1 of the first section 622 for the wave guide 1006 at the maximum light application efficiency is no more than about 35%. In thermally assisted magnetic recording, the light application efficiency required for a spot size converter is estimated to be at least about 35% and is shown by a dotted threshold line 1112. Thus, the wave guide 1006 of FIG. 10F would prove the least desirable of the wave guides 1001, 1002, 1003, 1004, 1005 to apply as a spot size converter 513 in a thermally assisted magnetic recording head. It can be seen from the results that the optimum modes for applying the lower refractive index cladding member 514 is in the in-surface direction adjacent to the spot size converter 513 with the rest of the cladding being the cladding member 523. Alternately, only one side of the cladding, that is adjacent to the spot size converter 513 in the in-surface direction, is the lower refractive index cladding member 514, while the rest of the cladding may be the cladding member 523.

Figure 12:
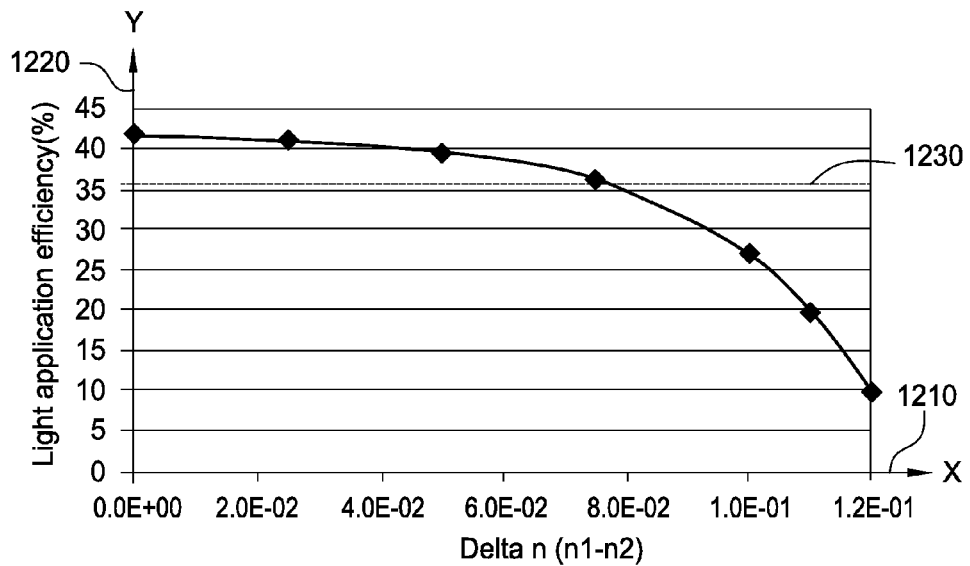
FIG. 12 is a graph illustrating the variation of light application efficiency of the spot size converter with respect to the difference of refractive indices for the lower refractive index cladding member and the cladding member.

FIG. 12 shows the calculated results for the light application efficiency of the spot size converter 513 in relation to the difference of refractive index for the lower refractive index cladding member 514 and the cladding member 523. The spot size converters 513 were configured similarly to the spot size converter 513 in FIG. 6A and FIG. 10E. The calculation for the light application efficiency used the beam propagation method (BPM). The horizontal axis 1210 in shows Delta n (Δn), i.e. the refractive index difference for the lower refractive index cladding member 514 and the cladding member 523. The vertical axis 1220 shows the light application efficiency for the spot size converter 513. It is desirable to meet or exceed thirty five percent (35%) light application efficiency in the spot size converter 513 and thus a threshold line 1230 is marked at the 35% value for the percent light application efficiency. The refractive index for the cladding member 523 is designated as n1 and the refractive index for the lower refractive index cladding member 514 is designated as n2. Delta n (n1−n2) is the refractive index of the cladding member 523 minus the lower refractive index for the cladding member 514. The maximum light application efficiency for the width w1 of the first section 622 of the spot size converter 513 was plotted against the respective refractive index differences (n1−n2). The results show that for the minimum light application efficiency of about 35% for the spot size converter is exceeded when the refractive index difference (n1−n2) for the lower refractive index cladding member 514 and the cladding member 523 is no more than about 0.080. Thus, delta n should be less than about 0.080.

Figure 13:
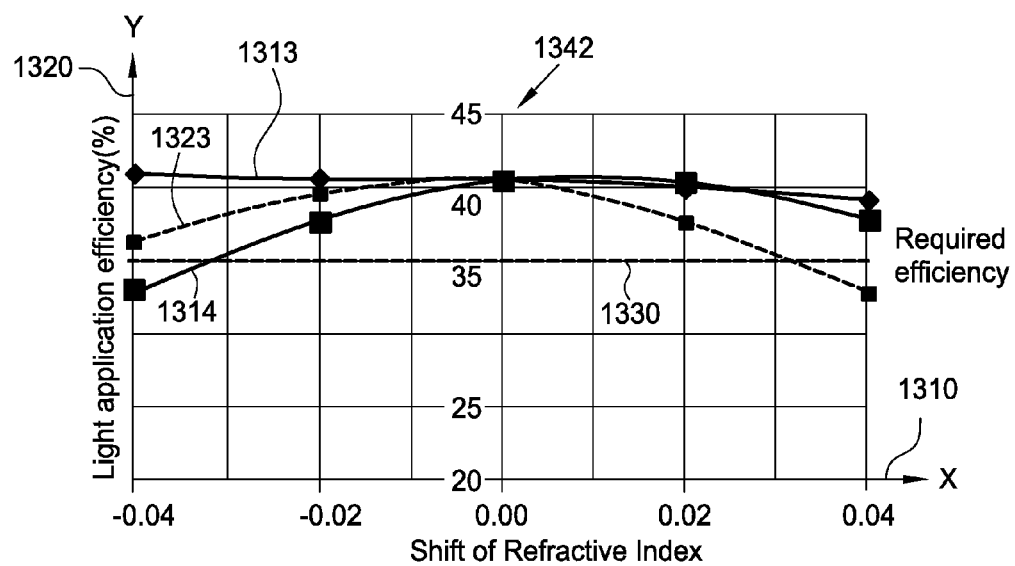
FIG. 13 is a graph illustrating the allowed values for the refractive indices of the lower refractive index cladding member and the cladding member of the spot size converter.

Acceptable values for the refractive indices of the spot size converter 513, the lower refractive index cladding member 514 and the cladding member 523 are shown in FIG. 13. FIG. 13 shows calculated results for variations in the light application efficiency for the spot size converter 513 when the spot size converter 513 deviates from the refractive index at which the light application efficiency is at a maximum 1342. The spot size converters 513 were configured similarly to the spot size converters 513 shown in FIG. 6A and FIG. 10E and the calculation for the light application efficiency used the beam propagation method (BPM). The refractive indices at which the light application efficiency of the spot size converter 513 is at the maximum 1342 was identified as Zero for the spot size converter 513 (shown by line labeled 1313), the lower refractive index cladding member 514 (shown by line labeled 1314), and the cladding member 523 (shown by line labeled 1323). The horizontal axis 1310 indicates the amount of deviation from this refractive index (η=0 (zero)). The vertical axis 1320 shows the light application efficiency of the spot size converter 513. It can be seen that the light application efficiency of about 35%, shown by dotted threshold line 1330, may be exceeded as long as the amount of deviation from n=0 for the refractive indices of the lower refractive index cladding member 514 and the cladding member 523 is no more than about +/−0.03. From these results, we determine the refractive indices of the lower refractive index cladding member 514 and the cladding member 523 should be within about +/−0.03 of the target refractive index value. However, as mentioned above, the magnitude of the refractive index for the spot size converter 513 should be greater than the refractive index for the cladding member 523 which in turn should be greater than the refractive index for the lower refractive index cladding member 514.

Figure 14:
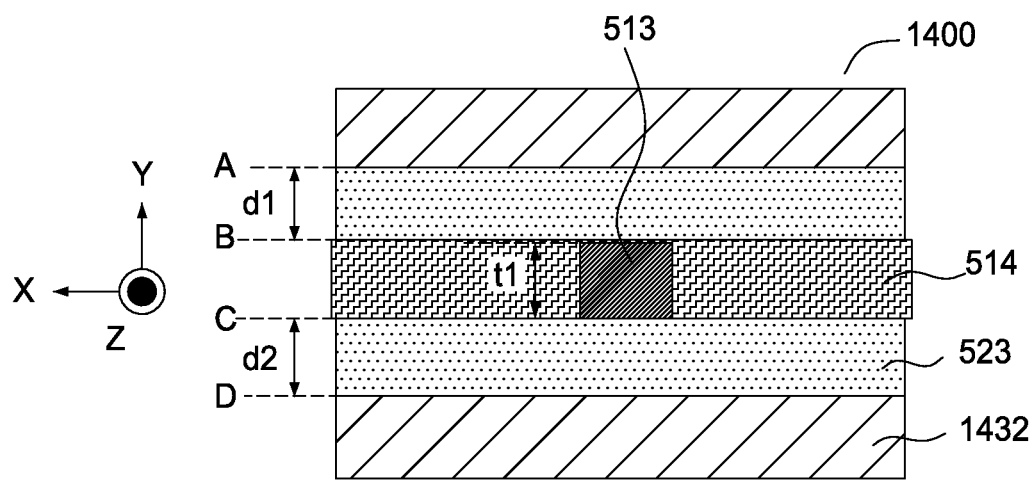
FIG. 14 is a top plan view for a portion of the magnetic write head showing the spot size converter with the refractive index of at least one adjacent cladding in the in-surface direction lower than the refractive index of cladding that is adjacently arranged in the film thickness direction sandwiched by external cladding members characterized in that the width of the opening is essentially infinite.

In the above embodiment, the refractive index of at least one cladding (i.e., in FIG. 6A, the lower refractive index cladding member 514) adjacent to the spot size converter 513 in the in-surface direction was lower than the refractive index of the cladding adjacent to the spot size converter 513 in the film thickness direction (i.e. the cladding member 523 in FIG. 6A). FIG. 14 illustrates a portion, illustrating a waveguide 1400, of the magnetic write head 305 having the spot size converter 513 with the refractive index of at least one adjacent cladding in the in-surface direction lower than the refractive index of cladding that is adjacently arranged in the film thickness direction sandwiched by an external cladding members 1432 characterized in that the width w1 of the first section 622 is essentially infinite, i.e. in the x-direction of FIG. 14. The external cladding members 1432 may have a lower refractive index than that of the cladding member 514. The region A-B and the region C-D function as two-dimensional waveguides. Thus, these regions A-B, C-D provide highly efficient optical coupling with the injected light 509 and efficiently transmit and couple the light 509 with the spot size converter 513.

Figure 15:
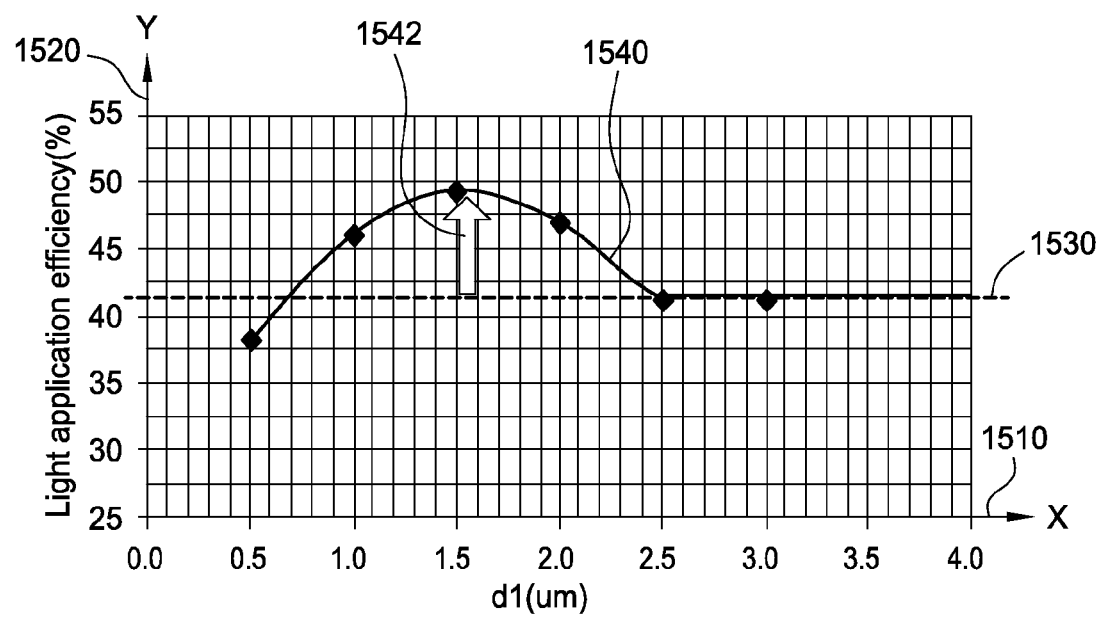
FIG. 15 is a graph illustrating the relationship of the light application efficiency and the distance from the lower refractive index cladding member to the external cladding member of the spot size converter shown in FIG. 14.

A distance (d1) may be calculated using the beam propagation method (BPM) by examining the dependence of the light application efficiency of the spot size converter 513 from the lower refractive index cladding member 514 to the external cladding members 1432. FIG. 15 graphically illustrates the relationship (shown by a line labeled 1540) of the light application efficiency and the distance from the lower refractive index cladding member 514 to the external cladding member 1432 of the spot size converter 513 shown in FIG. 14. The shape of the spot size converter 513 viewed from above the XZ plane is similar to that shown in FIG. 6B. The spot size converter 513 is substantially rectangular with a flare that increases in width towards the media facing surface 515 of the magnetic write head 305. The horizontal axis (x) 1510 shows the distance (d1), in units of micrometers, from the lower refractive index cladding member 514 to the external cladding members 1432. The vertical axis (y) 1520 shows the percent light application efficiency for the spot size converter 513. The distance d1 and a distance d2 from the lower refractive index cladding member 514 to the external cladding members 532 were assumed to be substantially similar (d1~d2) in the illustration. The light 509 injected to the spot size converter 513 may have a wavelength of about 830±20 nm, be polarized in the Y direction, and have a spot size of about 5 μm. The light application efficiency is at a maximum when the thickness d1 is about 1.55 μm (see arrow labeled 1542). The distance A-D (d1+t1+d2) is about 70% of the spot size for the injected light 509. The light application efficiency when the thickness d1 is essentially infinite is equivalent to the light utilization efficiency when the distance d1 is about at least 2.5 μm as shown by the flattening of the curve at 2.5 μm along line 1530. This is because the distances d1 and d2 are perceived by the injected light 509 equivalently when the thickness d1 and d2 is essentially infinite. Furthermore, by adjusting the thicknesses d1 and d2 in the range from about 0.7 μm to about 2.5 μm, higher light application efficiency may be achieved than the case where the thicknesses d1 and d2 are essentially infinite. The distance A-D (d1+t1+d2) having the thicknesses d1 and d2 in the range from about 0.7 μm to about 2.5 μm is in the range of about ±60% to about 70% of the spot size of the injected light 509. Therefore, the distance A-D may be adjusted in the range A-D so as to maintain the spot size. The spot size of the injected light 509 may be derived using the following analytical expression:

$$D(z) = D\sqrt{1 + \left(\frac{\lambda * z}{n * \pi (D/2)^2}\right)}$$

where:

D(z) is the spot size of the injected light;

D is the spot size of the light emitted from the light emission terminal of the light source;

λ is the wavelength in vacuum of the light that is emitted from the light source;

n is the refractive index of the medium through which the light that is emitted from the light emission terminal of the light source is propagated before being injected into the spot size converter; and z is the distance from the light emission terminal of the light source to the face where the light is injected into the spot size converter.

Although the thicknesses (d1, d2) of the upper and lower layer were made substantially similar in FIG. 14, the same beneficial effect can be obtained when the thicknesses of the upper and lower layer are not nearly equal, i.e. d1≠d2.

Figure 16:
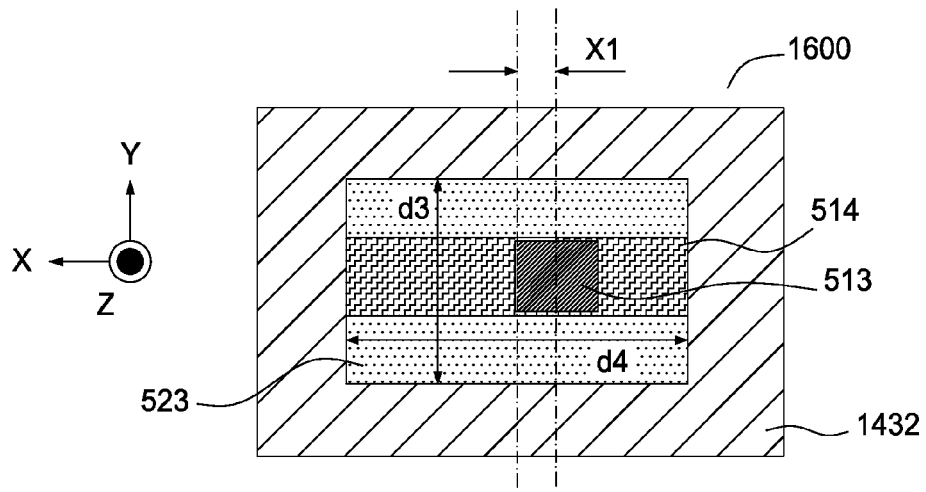
FIG. 16 is a top plan view for a portion of the magnetic write head showing the spot size converter with the refractive index of at least one cladding that is in the in-surface direction lower than the refractive index of cladding that is adjacently arranged in the film thickness direction sandwiched by external cladding members both in the in-surface direction and the film thickness direction.

FIG. 16 is a top plan view for a portion of the magnetic write head 305 showing the spot size converter 513 with the refractive index of at least one cladding that is in the in-surface direction lower than the refractive index of cladding that is adjacently arranged in the film thickness direction sandwiched by external cladding members 1432 both in the in-surface direction and the film thickness direction. The spot size converter of FIG. 16 has the same construction as that of FIG. 14 apart from the presence of the external cladding members 1432 in the in-surface direction and the central axis of the spot size converter 513 being offset X1 from the portion surrounded by the external cladding members 1432. Again, the beam propagation method (BPM) was used to calculate the light application efficiency.

Figure 17:
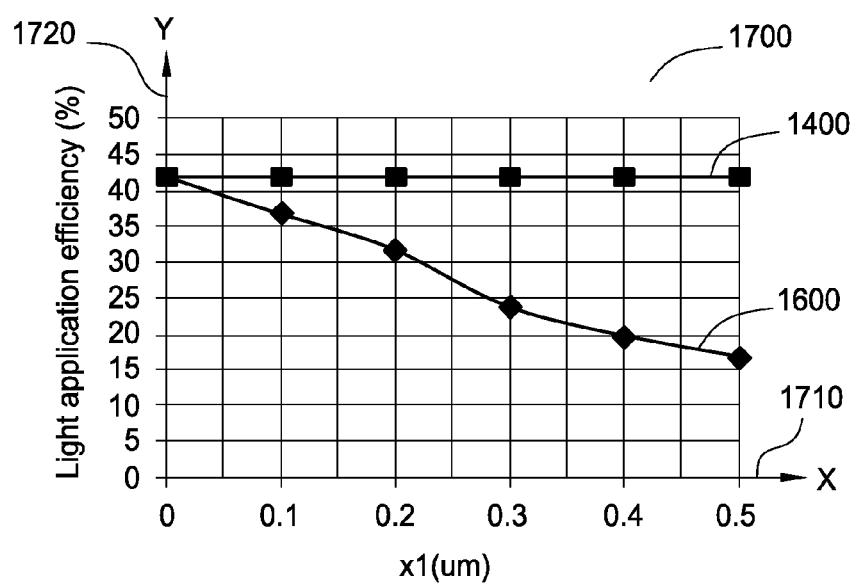
FIG. 17 is a graph illustrating the relationship of the light application efficiency of the spot size converter and the arrangement of the spot size converters shown in FIG. 16 and FIG. 14.

FIG. 17 is a graph illustrating the relationship of the light application efficiency for the spot size converter 513 depicted in FIG. 16, see graph line 1600, and the spot size converter 513 depicted in FIG. 14, see graph line 1400. The central axis is offset X1 in the X-axis direction in the calculations used to derive graph line 1600 for the spot size converter 513 of FIG. 16. The horizontal axis 1710 depicts the amount the central axis is offset X1 in the X-axis direction with respect to the portion of the spot size converter 513 surrounded by the external cladding members 1432. The vertical axis 1720 shows the light application efficiency of the spot size converter 513.

For the calculations, the width (d3) and the thickness (d4), shown in FIG. 16, were adjusted so that the light application efficiency was equivalent to the light application efficiency of the spot size converter 513 where the central axis offset amount (X1) in the X-axis direction was equal to about 0 (zero) as shown in FIG. 14. The spot size converter 513 was sandwiched by external cladding members 1432 solely in the aforementioned film thickness direction for graph line 1400. The spot size converter 513 was sandwiched by external cladding members 1432 in both the in-surface direction and the film thickness direction for graph line 1600. We can see that the spot size converter 513 sandwiched by external cladding members 1432 in both the in-surface direction and the film thickness direction, as shown in FIG. 16, increases the central axis offset amount (X1) in the X-axis direction and additionally decreases the light application efficiency.

The reason for is that a wave guide 1600 that is enclosed by external cladding members 1432 in both the in-surface direction and the film thickness direction functions as a three-dimensional waveguide. The central axis offset X1 in the X direction of the spot size converter 513 produces such a three-dimensional waveguide. The central axis offset X1 is a product of the light 509 that is propagated through the spot size converter 513 and the light 509 that is propagated through the interior of the three-dimensional waveguide. Consequently, when the light 509 propagated through the three-dimensional waveguide is coupled with the spot size converter 513, light coupling loss is generated due to the central axis offset of the light 509.

In contrast, the spot size converter 513 is sandwiched by external cladding members 1432 solely in the film thickness direction as shown in FIG. 14, there is no central axis offset in the X-axis direction. Therefore, it is not necessary to take into account the central axis offset X1 in this X-axis direction. Consequently, ease of manufacturing the spot size converter 513 can be improved by sandwiching the spot size converter 513 with external cladding members 1432 solely in the film thickness direction as shown in FIG. 14, compared with sandwiching the external cladding members 1432 in both the in-surface direction and the film thickness direction as shown in FIG. 16.

In a spot size converter as described supra, an optimal cladding configuration is formed when the cladding adjacent to the spot size converter in the surface direction is a cladding of a lower refractive index whereas the rest of the cladding is cladding of a higher refractive index than the aforementioned cladding of the lower refractive index. The spot size converter may be formed by constituting only one side of the adjacent cladding in the surface direction of the spot size converter with cladding of the lower refractive index and constituting the rest of the cladding with the cladding of higher refractive index than the aforementioned cladding of the lower refractive index. In this way, the minimum processing dimensions at the opening of the spot size converter may be improved while maintaining high light application efficiency for the spot size converter. Consequently, when applied to product manufacture, the accuracy of processing can be improved and variability can be suppressed.

The difference of refractive index of the cladding of the lower refractive index and the cladding of the higher refractive index in the spot size converter as described above is no more than 0.08. The range for the deviation of the refractive index with respect to the target values of the refractive index of the cladding for the lower refractive index and the cladding of higher refractive index is no more than ±0.03. In this way, the level of efficiency for optical utilization of the spot size converter is well suited required for thermally assisted magnetic recording.

Additionally, the light application efficiency of the aforementioned spot size converter may further be improved by sandwiching the top and bottom of the spot size converter with an external cladding. The sandwich construction forms a spot size converter of essentially infinite width. The external cladding may be characterized in that its refractive index is lower than that of the first-mentioned cladding and the distance from the external cladding at the top to the external cladding at the bottom may be adjusted so as to keep the spot size in the range of about 60% to about 70% of the spot size of the light that is injected into the spot size converter. In this way, the region between the top external cladding and the bottom external cladding functions as a two-dimensional waveguide. As a result, highly efficient optical coupling with the injected light is achieved and the light may be efficiently propagated to and coupled with the spot size converter.

With one embodiment, a magnetic write head for thermally assisted recording which minimize the coercive force is provided in which the light whose spot size is reduced to a submicron order can be directed, with high light application efficiency, onto a magnetic recording medium having a density which may exceed 1 Tbit/in$^2$. A magnetic recording device of large capacity and high recording density can be implemented using such a magnetic write head for thermally assisted recording.

The disclosure is not restricted to the embodiments described above, but includes various modifications. For example, while a detailed description of the above embodiments have been given in order to facilitate understanding of the disclosure, it is not necessarily essential to incorporate all of the details described. Also, it is possible to replace some of the construction for a given embodiment by the construction of another embodiment, or to add the construction of another embodiment to a given embodiment. Also, addition/deletion/substitution of other constructions can be performed in respect to the construction of the various embodiments.

While the foregoing is directed to embodiments of the disclosure, other and further embodiments of the disclosure may be devised without departing from the basic scope thereof, and the scope thereof is determined by the claims that follow.

What is claimed is:

1. A magnetic recording head, comprising: a body having an upper surface and a media facing surface; a spot size converter disposed in the body, the spot size converter comprising: a core, comprising: a first portion having a rectangular wall extending below the upper surface; and a second portion having a trapezoidal wall extending below the first portion; a first cladding adjacent to the spot size converter and in an in-surface direction of the spot size converter, wherein the first cladding has a first refractive index lower than a refractive index of the spot size converter, wherein the first cladding has a same thickness as the core; and a second cladding adjacent to and in contact with the spot size converter in a film thickness direction of the spot size converter, wherein the second cladding has a second refractive index lower than the refractive index of the spot size converter, and wherein the spot size converter and the first cladding are sandwiched between the second cladding, and the second cladding is divided into two portions by the first cladding and the spot size converter, wherein the first cladding is different from the second cladding and each of the two portions is completely separate from the other of the two portions throughout the entire width of the magnetic recording head in a direction parallel to the in-surface direction of the spot size converter.

2. The magnetic recording head of claim 1, wherein the second refractive index is higher than the first refractive index.

3. The magnetic recording head of claim 1, wherein a difference of the refractive index for the first and second cladding is no more than 0.08.

4. The magnetic recording head of claim 3, wherein a variation in the difference of the refractive index for the first and second cladding is no more than ±0.03.

5. The magnetic recording head of claim 1, wherein the core further comprises:
an opening where the core meets with the upper surface; and
a tip, wherein a width of the tip is greater than or equal to a width of the opening.

6. The magnetic recording head of claim 5, wherein the width of the opening is less than or equal to 0.5 μm.

7. The magnetic recording head of claim 6, wherein the width of the tip reduces a spot size to a nanometer range as a light propagates through the second portion of the spot size converter.

8. The magnetic recording head of claim 1, wherein the core has a third portion extending below the second portion and significantly parallel to the first portion.

9. The magnetic recording head of claim 1, further comprising:
a light source arranged above the upper surface of the magnetic recording head.

10. A hard drive, comprising: a frame; a magnetic recording medium disposed in the frame and fixed to a spindle that is driven to rotate by a motor; a suspension arm disposed in the frame and attached at a first end to a voice coil motor, wherein the voice coil motor is configured to move a second end of the suspension arm selectively over the magnetic recording medium; a magnetic write head disposed at the second end of the suspension arm and configured to record information on the magnetic recording medium; the magnetic write head comprising: a body having an upper surface opposite a media facing surface; a spot size converter disposed in the body, the spot size converter comprising: a core having an opening along the upper surface and a tip, the core comprising: a first portion having a rectangular wall extending below the upper surface; and a second portion having a trapezoidal wall extending below the first portion; a first cladding adjacent to the spot size converter and in an in-surface direction of the spot size converter, wherein the first cladding has a first refractive index lower than a refractive index of the spot size converter, wherein the first cladding has a same thickness as the core; and a second cladding adjacent to and in contact with the spot size converter in a film thickness direction of the spot size converter, wherein the second cladding has a second refractive index lower than the refractive index of the spot size converter, and wherein the spot size converter and the first cladding are sandwiched between the second cladding, and the second cladding is divided into two portions by the first cladding and the spot size converter, wherein the first cladding is different from the second cladding and each of the two portions is completely separate from the other of the two portions throughout the entire width of the magnetic write head in a direction parallel to the in-surface direction of the spot size converter.

11. The hard drive of claim 10, further comprising:
a light source disposed at the second end of the suspension arm above the magnetic write head, wherein the light source is configured to emanate a light into the opening of the spot size converter.

12. The hard drive of claim 11, wherein a width of the tip is greater than or equal to a width of the opening.

13. The hard drive of claim 12, wherein the width of the opening is less than or equal to 0.5 μm.

14. The hard drive of claim 12, wherein the width of the tip reduces a spot size to a nanometer range as a light propagates through the second portion of the spot size converter.

15. The hard drive of claim 10, wherein the core has a third portion extending below the second portion and parallel to the first portion.

16. The hard drive of claim 10, wherein a difference of the refractive index for the first cladding and the second cladding members is no more than 0.08.

17. A magnetic recording head, comprising: a body having an upper surface and a media facing surface; a spot size converter disposed in the body; a first cladding adjacent to the spot size converter and in an in-surface direction of the spot size converter, wherein the first cladding has a first refractive index lower than a refractive index of the spot size converter, wherein the first cladding has a same thickness as the spot size converter; a second cladding adjacent to the and in contact with spot size converter in a film thickness direction of the spot size converter, wherein the second cladding has a second refractive index lower than the refractive index of the spot size converter, and wherein the spot size converter and the first cladding are sandwiched between the second cladding, and the second cladding is divided into two portions by the first cladding and the spot size converter, wherein the first cladding is different from the second cladding and each of the two portions is completely separate from the other of the two portions throughout the entire width of the magnetic recording head in a direction parallel to the in-surface direction of the spot size converter; a third cladding in contact with the second cladding, wherein the second cladding is sandwiched between the third cladding, and wherein the third cladding has a third refractive index lower than the first refractive index.

18. The magnetic recording head of claim 17, wherein the third cladding is additionally arranged in an in-surface direction of the spot size converter and the first cladding.

19. The magnetic recording head of claim 17, wherein the second refractive index is higher than the first refractive index.

\* \* \* \* \*

UNITED STATES PATENT AND TRADEMARK OFFICE
CERTIFICATE OF CORRECTION

PATENT NO.          : 9,280,994 B1
APPLICATION NO.     : 14/493299
DATED               : March 8, 2016
INVENTOR(S)         : Yasuhiko Iwanabe Page 1 of 1

It is certified that error appears in the above-identified patent and that said Letters Patent is hereby corrected as shown below:

Specification

In the Detailed Description:

Column 10, Lines 2-3, please delete "$\overline{W}w = \dfrac{\pi}{2\pi \cdot n_1 \cdot \sin\theta_1 / \lambda} \quad (1)$" and insert -- $Ww = \dfrac{\pi}{2\pi \cdot n_1 \cdot \sin\theta_1 / \lambda} \quad (1)$ -- therefor.

Signed and Sealed this
Seventeenth Day of May, 2016

Michelle K. Lee
*Director of the United States Patent and Trademark Office*